United States Patent Office 3,594,278
Patented July 20, 1971

3,594,278
PREPARATION OF POLYNUCLEOTIDES
Robert Naylor, Glendale, Wis., assignor to Pabst Brewing Company, Milwaukee, Wis.
No Drawing. Filed Dec. 31, 1968, Ser. No. 788,319
Int. Cl. C12d 13/06
U.S. Cl. 195—28          8 Claims

ABSTRACT OF THE DISCLOSURE

Polynucleotides are prepared by enzymatic polymerization of a nucleotide, e.g., inosine diphosphate or cytidine diphosphate, followed by a recovery process employing a surfactant and a finely divided solid adsorbent which yields an active polynucleotide free from impurities.

---

This invention relates to the preparation and purification of polynucleotides and particularly to the preparation of polyinosinic acid, hereinafter called "Poly I," and polycytidilic acid, hereinafter called "Poly C," by the enzymatic polymerization of inosine diphosphate to produce Poly I and cytidine diphosphate to produce Poly C and the subsequent purification of the resultant products.

In general, nucleotides contain three components in the molecule namely a base component, a sugar component and a phosphate component, the base component and the phosphate component being separately linked to the sugar component. The combination of the base component and the sugar component is usually referred to as a nucleoside. When the phosphate component is also present the compound is called a nucleotide. The nucleoside phosphates can be polymerized by the action of enzymes to produce high molecular weight compounds known as polynucleotides in which the sugar components are connected together through a

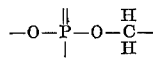

linkage. In the case of inosine diphosphate or cytidine diphosphate the sugar component is a five membered ring and the polymerization occurs in the 3' or 5' positions.

It is known that Poly I and Poly C when mixed together form a double stranded polyinosinic:polycytidilic acid duplex, hereinafter referred to as PI:C. It is also known that PI:C when injected into the bloodstream of animals causes the body to produce an increased amount of interferon which has an antiviral effect, as described in Science, volume 162, pages 811–813, Nov. 15, 1968.

Since the enzymatic polymerization of a nucleotide is likely to give rise to the formation of compounds of varying molecular weight as well as by-products, it is highly desirable to carry out the preparation and purification of Poly I and Poly C in such a manner as to control the composition of the resultant product within well defined limits and to eliminate by-products which might be toxic or otherwise undesirable.

One of the objects of the present invention is to provide a process of preparing and purifying polynucleotides by enzymatic polymerization of a nucleotide such as inosine diphosphate or cytidine diphosphate whereby the composition of the product can be controlled within well defined limits.

A more specific object of the invention is to provide a new and improved process for preparing Poly I.

Another specific object of the invention is to provide a new and improved process for preparing Poly C. Other objects will appear hereinafter.

In accordance with the invention a polynucleotide is prepared by enzymatic polymerization of a nucleotide, e.g., inosine diphosphate, to make Poly I, or cytidine diphosphate to make Poly C, by subjecting the nucleotide to enzymatic action with an enzyme such as polynucleotide phosphorylase from *Micrococcus lysodeikticus* in an aqueous medium buffered to an alkaline pH, preferably around 9.0, and preferably with tris-hydroxymethylaminomethane, said medium also containing urea, a chelating agent, for instance, the disodium salt of ethylenediamine tetraacetic acid, and magnesium chloride, carrying out the polymerization at ordinary temperatures, for example, 25° C. until the maximum viscosity is obtained, and thereafter stopping the enzymatic polymerization and purifying the resultant product by a series of steps comprising mixing the enzyme reaction mixture with a surfactant, a finely divided solid adsorbent, and concentrated liquid phenol, allowing the resultant mixture to settle, recovering the supernatant liquid, removing any suspended solid particles from the supernatant liquid, precipitating the polynucleotide by adding an aqueous saturated salt solution and ethyl alcohol to the supernatant liquid preferably at low temperatures around 3°–5° C., recovering the precipitated polynucleotide, redissolving the precipitate in water, dialyzing the aqueous solution of the polynucleotide successively against a solution of a chelating agent, for example, ethylenediamine tetraacetic acid, a salt solution and water, filtering through a Millipore filter and filter paper( preferably 8 micron paper), and lyophilizing until a solid product is obtained.

In this process the addition of the surfactant and the adsorbent removes enzymes and nucleases, thereby stopping further enzymatic action. While any well known surfactants, for example, alcohol sulfates, can be used, it is preferable to use sodium dodecyl sulfate. The adsorbent is preferably bentonite although diatomaceous earth and other types of adsorbents can be used. The liquid phenol is preferably a 90% solution of phenol in water which is buffered to the pH of the enzyme reaction mixture, preferably using the same buffer employed in carrying out the enzyme reaction.

The phenol extracts proteins from the reaction product and makes it possible to obtain a clear solution. The extraction with phenol is preferably repeated two or three times and thereafter the entire aqueous phase which has been separated from the phenol is preferably centrifuged, the supernatant liquid being recovered.

The alcohol-salt solution precipitation of the polynucleotide is preferably carried out using a saturated solution of potassium chloride and a denatured alcohol commonly known as SDA consisting of 95% ethanol and 5% methanol. Instead of potassium chloride other salts can be used which are soluble in an aqueous alcohol solution, for example, sodium chloride, potassium acetate or sodium acetate. The polynucleotide obtained by the alcohol-salt precipitation is preferably redissolved in water and reprecipitated a second time with an alcohol-salt precipitation. The final precipitate is then dissolved in water and dialyzed successively preferably at a low temperature of 3°–5° C. against a solution of a chelating agent such as ethylene diamine tetraacetic acid capable of removing magnesium chloride, a solution of a salt such as potassium acetate capable of removing unreacted diphosphate, and finally against distilled water preferably five or six times until a pure product of constant composition is obtained.

It is then preferable to filter the dialyzed solution before lyophilizing. In the lyophilization step the filtered dialyzed solution is placed in trays and water is removed by freeze drying.

The procedural steps used in the preparation of Poly I and Poly C are the same except for the nucleotide used as a starting material and with the further exception that in purifying the Poly I after the final alcohol-salt precipitation and just before dialyzing, the Poly I is dissolved in water and a solution of potassium acetate having a pH of about 7.6 is added, the concentration of the potassium acetate solution being such as to give a final solution that is one-quarter saturated with respect to potassium acetate. This precipitates Poly I leaving unreacted diphosphate in solution. The Poly I is dissolved in water again and further purified by dialyzing in the manner previously described.

The invention will be further illustrated by the following examples in which the quantities are given by weight unless otherwise indicated.

EXAMPLE I

Preparation of Poly C 260 grams of cytidine 5'-diphosphate was dissolved in distilled water to give a total of 4 liters of solution and the pH was adjusted to pH 9.0 with potassium hydroxide. 2.6 liters of a 1 molar aqueous solution of tris-hydroxymethylaminomethane was added. In addition, 1,040 mls. of an 8 molar aqueous solution of urea, 1,300 mls. of a 0.02 molar aqueous solution of the disodium salt of ethylenediamine tetraacetic acid and 338 mls. of a 0.2 molar aqueous solution of magnesium chloride were added. To this mixture was then added the enzyme polynucleotide phosphorylase from *Micrococcus lysodeikticus*. This addition was made from three different lots of enzyme consisting of an aqueous solution of 300 mls. having an activity of 12.6 units per liter, 400 mls. having an activity of 28 units per liter, and 150 mls. having an activity of 31 units per liter, the total activity, therefore, being 17.68 gram units. Additional water was added to make a total volume of 26 liters and the reaction started at room temperature (25° C.). Samples of the reaction mixture were withdrawn in a tube at ½ hour intervals and the viscosity was noted by determining the number of seconds required for the mixture to flow from the tube. The maximum viscosity was obtained at 4 hours and 45 minutes but the reaction was continued for another half hour, at the end of which it was noted the viscosity had begun to drop.

At this point 260 mls. of a 10% aqueous solution of sodium dodecyl sulfate was added to the reaction mixture which was then stirred for 20 minutes. After that 65 mls. of a 4% suspension of bentonite in water was added and the mixture stirred for 20 minutes. The mixture was then transferred to a 30 gallon glass lined jacketed tank.

In a separate container having a bottom outlet 610 mls. of an aqueous 2 molar solution of tris-hydroxymethylaminomethane (pH 9.0) was mixed with 5000 mls. of water and 27 liters of liquid phenol consisting of 90% phenol and 10% water. This mixture was stirred and then added to the enzyme reaction mixture. After stirring for one hour the resultant mixture was allowed to separate for a period of about 17 hours. The phenol layer was then drawn off.

The residual solution was treated with 260 mls. of a 10% aqueous solution of sodium dodecyl sulfate, stirred 15 minutes and then with 65 mls. of a 4% bentonite suspension and stirred 15 minutes. To the resultant mixture was added a buffered solution of phenol prepared by separately mixing 27 liters of liquid phenol containing 90% phenol and 10% water, 610 mls. of a 2 molar aqueous solution of tris-hydroxymethylaminomethane and 5000 mls. water. After the addition of the solution of phenol, the mixture was stirred one hour and allowed to separate. The solution of phenol was removed, the extraction was repeated and the mixture was allowed to settle over night. After settling, the solution of phenol was drawn off.

To the residual solution there were added 130 mls. of of a 10% aqueous solution of sodium dodecyl sulfate followed by stirring for 15 minutes and 35 mls. of a 4% suspension in water of bentonite followed by stirring for 15 minutes. In a separate container 13.5 liters of liquid phenol containing 90% phenol and 10% water were mixed with 2500 mls. water and 305 mls. of a 2 molar aqueous solution of tris-hydroxymethylaminomethane. This phenolic solution was added to the solution containing the Poly C and the resultant mixture was stirred for one hour after which it was allowed to separate and the phenolic solution removed. This same procedure was repeated.

Then the entire aqueous phase containing the Poly C was centrifuged after which the supernatant liquid was placed in a cold room at a temperature of about 4° C.

To the supernatant liquid was then added 3700 mls. of water saturated with potassium chloride followed by 60 liters of a mixture of 95% ethyl alcohol and 5% methyl alcohol. The resultant mixture was allowed to settle over night. The supernatant liquid was siphoned off and the precipitate was centrifuged, collected and dissolved in 18 liters of distilled water.

To the resultant solution there was added 2810 mls. of water saturated with potassium chloride and 40 liters of a mixture of 95% ethyl alcohol and 5% methyl alcohol.

The resultant precipitate was collected and dissolved in 18 liters of water and allowed to remain over night at a temperature of 4° C. At this point the solution had a pH of 7.2. This solution was then placed in a plurality of dialyzing tubes made from regenerated cellulose having a diameter of 47 mm. and a capacity of about one liter each. The tubes, each containing about one liter of solution, were then dialkyzed against 200 liters of a 0.01 molar aqueous solution of ethylenediamine tetraacetic acid at a pH of 7.5 in a cold room having a temperature of about 4° C. for 24 hours, then dialyzed against the same amount of a 0.1 molar aqueous solution of potassium acetate at the same pH under the same temperature conditions for another 24 hours and thereafter dialyzed successively for 6 24-hour periods under the same temperature conditions against the same quantity of distilled water.

The solutions were then removed from the dialyzing tubes and filtered through a Millipore filter and 8-micron filter paper and washed to a final solution of 22 liters. Thereafter the product (Poly C) was recovered by lyophilizing, i.e., the solution was placed in trays and the water was removed by freeze drying.

The Poly C as its neutral potassium salt had the following properties:

Extinction values relative to phosphorus content:
  $\Sigma_p$, 260 m$\mu$, pH 7—$5.0 \pm 1.0 \times 10^3$
Spectral ratios at pH 7:
  250/260—$0.86 \pm 0.03$
  280/260—$0.80 \pm 0.03$
Phosphorus content:
  Micromoles/mg.—$2.7 \pm 0.5$
  Percent P—$8.4 \pm 1.5$
Sedimentation coefficient:
  $S_{20,w}$—8–13
Low molecular weight impurities:
  Ultracentrifuge—not detected
  Paper chromatography—not detected
Homogeneity with respect to purine or pyrimidine base:
  Degrade with ribonuclease and examine by paper electrophoresis—no contaminants detected

EXAMPLE II

Preparation of Poly I

The procedure was the same as in Example I except that inosine 5'-diphosphate was used in place of cytidine 5' diphosphate and in the recovery process and after the final alcohol-salt precipitation and just before dialyzing, the Poly I was dissolved in water and a solution of potassium acetate having a pH of about 7.6 was added, the concentration of the potassium acetate solution being such as to give a final solution that was one-quarter saturated with respect to potassium acetate. This precipitated the Poly I which was dissolved in distilled water again and further purified by dialyzing in the manner described in Example I.

The Poly I had the following properties:

Extinction values relative to phosphorus content:
 $\Sigma_p$, 260 m$\mu$, pH 7—6.0±1.0×10$^3$
Spectral ratios at pH 7:
 250/260—1.63±0.05
 280/260—0.28±0.02
Phosphorus content:
 Micromoles/mg.—2.2±0.5
 Percent P—6.8±1.5%
Sedimentation coefficients:
 $S_{20,w}$—10–15
Low molecular weight impurities:
 Ultracentrifuge—not detected
 Paper chromatography—not detected
Homogeneity with respect to purine or pyrimidine base:
 Degrade with alkali and examine by paper electrophoresis—no contaminants detected The Poly C prepared as in Example I and the Poly I prepared as in Example II can be mixed in equimolar concentration in 0.01 molar phosphate-buffered saline at pH 7.2 containing $5 \times 10^{-3}$ molar magnesium chloride to form PI:C and used in the manner described in Science, volume 162, pp. 811–813.

The invention has the advantage that is provides for the preparation and purification of polynucleotides, for example, Poly I and Poly C, in such a manner as to control the composition of the resultant product within well defined limits and to eliminate by-products which might be toxic or otherwise undesirable.

The invention is hereby claimed as follows:

1. In the preparation of a polynucleotide by enzymatic polymerization of a nucleotide in the presence of water under alkaline conditions, a recovery process which comprises the following steps:
 (a) mixing the aqueous enzyme reaction mixture with a surfactant and a finely divided solid adsorbent to stop the enzyme reaction and remove nucleases;
 (b) repeatedly extracting the residual solution with liquid phenol buffered to the pH of the enzyme reaction mixture to remove protein;
 (c) precipitating the poly nucleotide by adding an aqueous salt solution and ethyl alcohol to the liquid obtained from (b);
 (d) recovering the precipitate from (c) and redissolving it in water;
 (e) dialyzing the aqueous solution from (d) against a solution of a chelating agent capable of abstracting metal ions;
 (f) dialyzing the solution from (e) against a salt solution capable of removing unreacted nucleotide;
 (g) repeatedly dialyzing the solution from (f) against distilled water, and
 (h) recovering the resultant polynucleotide.

2. A process as claimed in claim 1 in which step (c) is repeated.

3. A process as claimed in claim 1 in which the nucleotide is a nucleotide 5′-diphosphate.

4. A process as claimed in claim 1 in which the nucleotide is cytidine 5′-diphosphate and the polynucleotide is Poly C.

5. A process as claimed in claim 1 in which the nucleotide is inosine 5′-diphosphate and the polynucleotide is Poly I.

6. A process as claimed in claim 5 in which between steps (d) and (e) the solution from step (d) is mixed with a solution of potassium acetate in water having a pH of about 7.6 and a concentration sufficient to give a final solution that is one-quarter saturated with respect to potassium acetate, the precipitated polynucleotide being collected and dissolved in water again prior to step (e).

7. A process for preparing Poly C which comprises subjecting cytidine 5′-diphosphate dissolved in water and buffered to a pH of about 9 to enzymatic polymerization with polynucleotide phosphorylase from *Micrococcus lysodeikticus*, said solution also containing urea, the disodium salt of ethylenediamiie tetraacetic acid and magnesium chloride, carrying out the enzymatic polymerization until the maximum viscosity is obtained, and thereafter recovering the product as set forth in steps (a) to (h) of claim 1.

8. A process for preparing Poly I which comprises subjecting inosine 5′-diphosphate dissolved in water and buffered to a pH of about 9 to enzymatic polymerization with polynucleotide phosphorylase from *Micrococcus lysodeikticus*, said solution also containing urea, the disodium salt of ethylenediamine tetraacetic acid and magnesium chloride, carrying out the enzymatic polymerization until the maximum viscosity is obtained, and thereafter recovering the product by a series of steps as claimed in claim 6.

References Cited

Davidson et al., Progress in Nucleic Acid Research, vol. 1, pp. 93–133 (1963).

ALVIN E. TANENHOLTZ, Primary Examiner

U.S. Cl. X.R.

260—211.5